Figure 1:
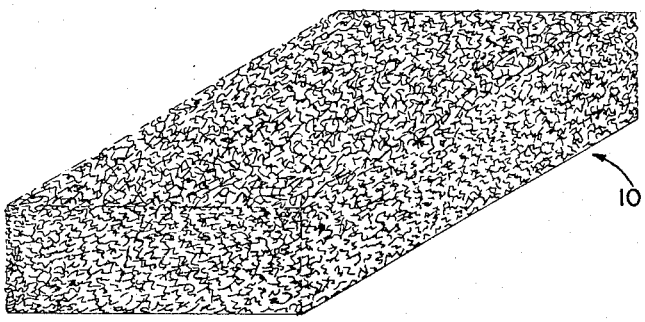
Figure 2:
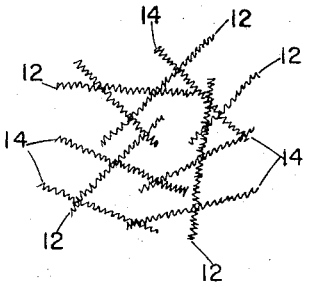
Figure 3:
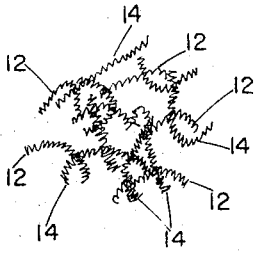
Figure 4:
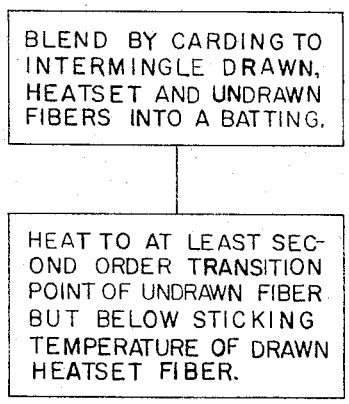
Figure 5:
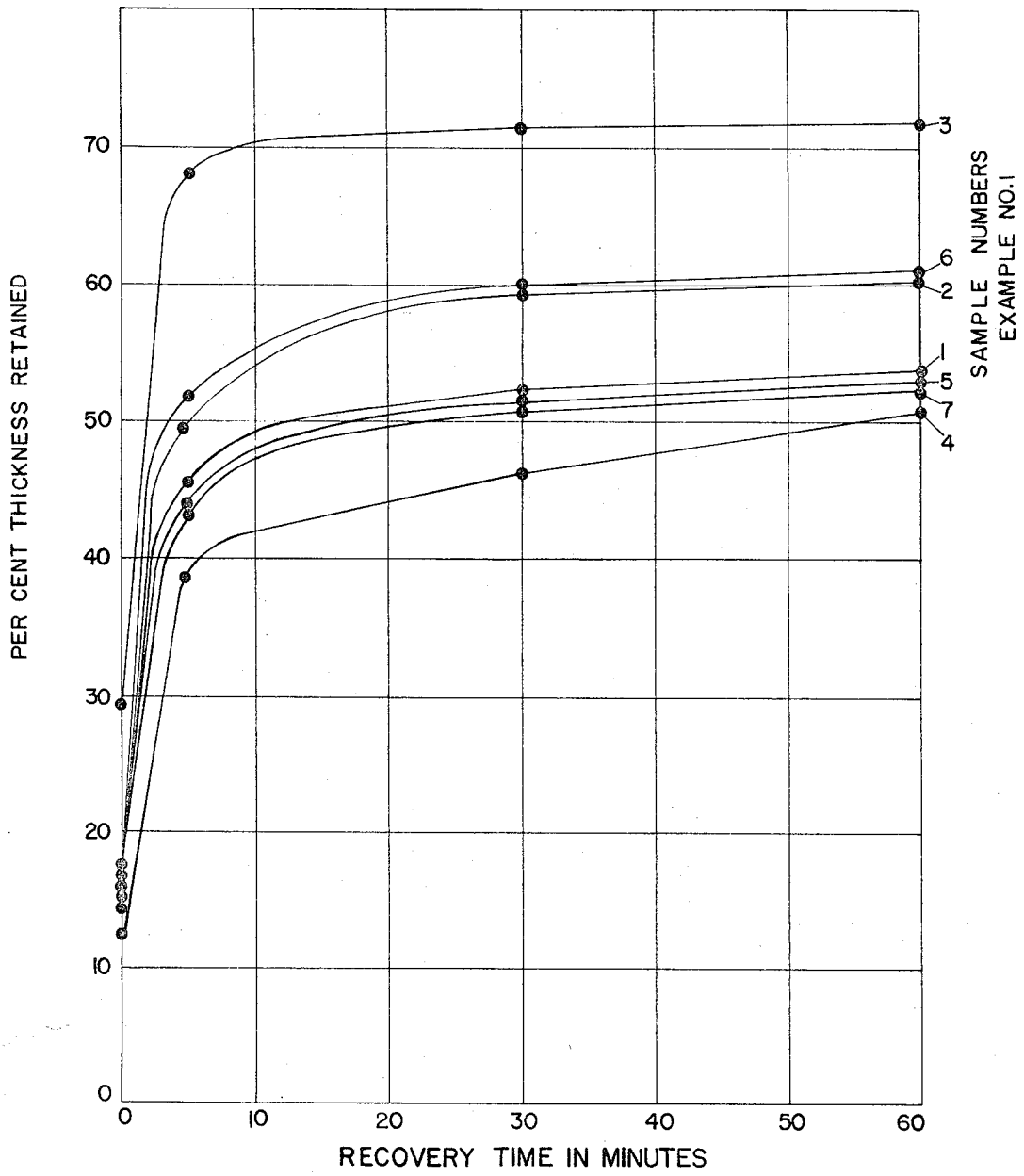

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 18, 1970

877 O.G. 491

T877,009
RESILIENT, FIBROUS BATTING

Richard Dixon Neal and Frank Herbert De Nobriga, both % Tennessee Eastman Company, P.O. Box 511, Kingsport, Tenn. 77661

Continuation of application Ser. No. 602,637, Dec. 19, 1966. This application Feb. 9, 1970, Ser. No. 9,100
Int. Cl. D04h *1/06*
U.S. Cl. 161—150
2 Sheets Drawings. 20 Pages Specification

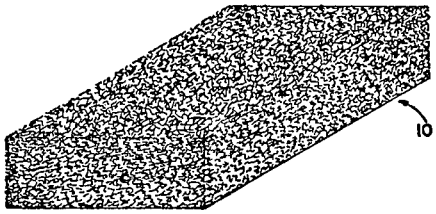

A fibrous batting product having a high degree of compression recovery and structural integrity and comprising polymeric fibers having a relatively low degree of molecular orientation intermingled with polymeric fibers having a relatively high degree of molecular orientation with the first mentioned fibers being adhered at random points to the second mentioned fibers and being shrunk in length so that the second mentioned fibers have been pulled into loops, swirls and other configurations differing from a substantially straight line; and the method for making the product. The first group may be undrawn polyethylene terephthalate and the second group may be selected from group consisting of drawn poly(1,4-cyclohexylene-dimethylene terephthalate) and drawn polyethylene terephthalate fibers. The batting may be heated to a temperature at least as high as the second order transition temperature of the fibers having a relatively low degree of molecular orientation but substantially not greater than the sticking point of the fibers having a relatively high degree of molecular orientation whereby the fibers having the low degree of molecular orientation will shrink causing the batting to shrink in length and breadth and tend to expand in thickness. If the fibers are crimped, upon heating, the crimped knuckles of the fibers having a low degree of molecular orientation will interengage with the crimped knuckles of the fibers having a relatively high degree of molecular orientation.

RESILIENT, FIBROUS BATTING

Original Filed Dec. 19, 1966 2 Sheets-Sheet 1

Richard D. Neal
Frank H. de Nobriga
INVENTORS
BY William T. French
George P. Chandler
ATTORNEYS

RESILIENT, FIBROUS BATTING

Original Filed Dec. 19, 1966 2 Sheets-Sheet 2

Richard D. Neal
Frank H. deNobriga
INVENTORS

BY William T. French
George P. Chandler
ATTORNEYS